United States Patent
Kasahara et al.

(10) Patent No.: US 10,685,432 B2
(45) Date of Patent: Jun. 16, 2020

(54) INFORMATION PROCESSING APPARATUS CONFIGURED TO DETERMINE WHETHER AN ABNORMALITY IS PRESENT BASED ON AN INTEGRATED SCORE, INFORMATION PROCESSING METHOD AND RECORDING MEDIUM

(71) Applicants: Ryosuke Kasahara, Kanagawa (JP); Takuya Tanaka, Tokyo (JP)

(72) Inventors: Ryosuke Kasahara, Kanagawa (JP); Takuya Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 15/872,257

(22) Filed: Jan. 16, 2018

(65) Prior Publication Data
US 2018/0204316 A1 Jul. 19, 2018

(30) Foreign Application Priority Data
Jan. 18, 2017 (JP) .................................. 2017-006524
May 26, 2017 (JP) .................................. 2017-104704

(51) Int. Cl.
*G06K 9/40* (2006.01)
*G06T 7/00* (2017.01)
(Continued)

(52) U.S. Cl.
CPC .............. *G06T 7/0002* (2013.01); *G06K 9/56* (2013.01); *G06K 9/6256* (2013.01); *G06T 5/20* (2013.01);
(Continued)

(58) Field of Classification Search
CPC ......... G06T 2207/30168; G06T 7/0014; G06T 2207/20076; G06K 9/00013; G06K 9/40;
(Continued)

(56) References Cited

U.S. PATENT DOCUMENTS

| | | | |
|---|---|---|---|
| 6,983,065 B1* | 1/2006 | Akgul | G06K 9/4619 348/125 |
| 2002/0081033 A1* | 6/2002 | Stentiford | G06K 9/4671 382/218 |

(Continued)

FOREIGN PATENT DOCUMENTS

| | | |
|---|---|---|
| JP | 2008-020235 | 1/2008 |
| JP | 2012-181148 | 9/2012 |

(Continued)

OTHER PUBLICATIONS

Pinheiro et al,., 2014, From Image-level to Pixel-level Labeling with Convolutional Networks, arXiv:1411.6228v3 [cs.CV] (Submitted on Nov. 23, 2014 (v1), last revised Apr. 24, 2015), pp. 1-9.*

*Primary Examiner* — Guillermo M Rivera-Martinez
(74) *Attorney, Agent, or Firm* — Harness, Dickey & Pierce, P.L.C.

(57) ABSTRACT

An apparatus and a method are disclosed, each of which applies a plurality of different spatial filters to one input image to generate a plurality of filtered images; calculates, for each of a plurality of pixels included in each of the plurality of filtered image, a score indicating a value determined by a difference from a corresponding one of a plurality of model groups, using the plurality of model groups that respectively correspond to the plurality of filtered images and each including one or more models having a parameter representing a target shape; calculates an integrated score indicating a result of integrating the scores of the respective plurality of pixels corresponding to each other over the plurality of filtered images; and determines an abnormality based on the integrated score.

16 Claims, 6 Drawing Sheets

(51) Int. Cl.
   *G06K 9/62*      (2006.01)
   *G06T 5/20*      (2006.01)
   *G06K 9/56*      (2006.01)

(52) U.S. Cl.
   CPC ............... *G06T 2207/20076* (2013.01); *G06T 2207/30168* (2013.01)

(58) Field of Classification Search
   CPC ........ G06K 9/6256; G06K 9/66; G06F 19/00; G06F 17/5045; G06F 17/5081
   See application file for complete search history.

(56) References Cited

U.S. PATENT DOCUMENTS

| | | | | |
|---|---|---|---|---|
| 2003/0219172 A1* | 11/2003 | Caviedes | ............ | H04N 17/004 382/286 |
| 2007/0230770 A1* | 10/2007 | Kulkarni | ............ | G06F 17/5045 382/149 |
| 2008/0008396 A1* | 1/2008 | Kisilev | ............ | G06K 9/40 382/272 |
| 2014/0201126 A1* | 7/2014 | Zadeh | ............ | G06N 7/005 706/52 |
| 2015/0296193 A1* | 10/2015 | Cote | ............ | H04N 9/646 382/167 |
| 2015/0324662 A1* | 11/2015 | Garg | ............ | G06K 9/4661 382/165 |
| 2016/0127405 A1 | 5/2016 | Kasahara | | |
| 2017/0004399 A1 | 1/2017 | Kasahara | | |
| 2017/0154234 A1 | 6/2017 | Tanaka et al. | | |
| 2017/0262974 A1 | 9/2017 | Kasahara | | |
| 2017/0323431 A1* | 11/2017 | Sarkar | ............ | G06T 5/003 |
| 2018/0032846 A1* | 2/2018 | Yang | ............ | G06K 9/00711 |

FOREIGN PATENT DOCUMENTS

| | | |
|---|---|---|
| JP | 2014-056415 | 3/2014 |
| JP | 2017-167624 | 9/2017 |

* cited by examiner

INFORMATION PROCESSING APPARATUS CONFIGURED TO DETERMINE WHETHER AN ABNORMALITY IS PRESENT BASED ON AN INTEGRATED SCORE, INFORMATION PROCESSING METHOD AND RECORDING MEDIUM

CROSS-REFERENCE TO RELATED APPLICATIONS

This patent application is based on and claims priority pursuant to 35 U.S.C. § 119(a) to Japanese Patent Application Nos. 2017-006524, filed on Jan. 18, 2017, and 2017-104704, filed on May 26, 2017, in the Japan Patent Office, the entire disclosure of which is hereby incorporated by reference herein.

BACKGROUND

Technical Field

The present invention relates to an information processing apparatus, an information processing method, and a recording medium.

Description of the Related Art

A machine learning algorithm is known, which determines a state of certain data. The machine learning can be widely applied, such as to determine whether or not a subject appearing in an image is a person, identify a scene appearing in an image, identify a sentence, identify audio, and the like.

The machine learning algorithm is also used to identify a material or to inspect a defect in the material. For example, an abnormality such as a defect can be detected using multi-resolution analysis. In such case, a defect or a non-defect is determined using a plurality of images having respective resolutions, based on detection of an abnormal quantity or comparison with a feature value prepared in advance. However, in order to determine a degree of abnormality, it has been necessary to adjust various parameters since there is no statistically meaningful threshold value.

SUMMARY

Example embodiments of the present invention include an information processing apparatus, which: applies a plurality of different spatial filters to one input image to generate a plurality of filtered images; calculates, for each of a plurality of pixels included in each of the plurality of filtered image, a score indicating a value determined by a difference from a corresponding one of a plurality of model groups, using the plurality of model groups that respectively correspond to the plurality of filtered images and each including one or more models having a parameter representing a target shape; calculates an integrated score indicating a result of integrating the scores of the respective plurality of pixels corresponding to each other over the plurality of filtered images; and determines an abnormality based on the integrated score.

Example embodiments of the present invention include an information processing method and a recording medium storing an information processing program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
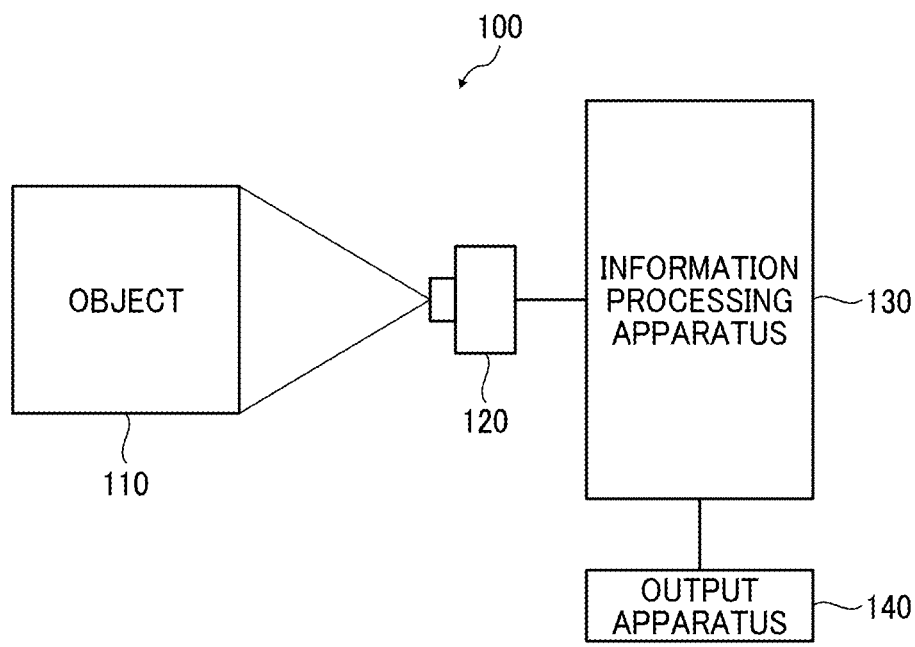
FIG. 1 is a diagram illustrating a schematic configuration of an information processing system, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an information processing apparatus, an information processing method, and a program according to the present invention will be described in detail referring to the accompanying drawings.

FIG. 1 is a diagram illustrating a schematic configuration of an information processing system 100 of a present embodiment. The information processing system 100 of FIG. 1 functions as an inspection system for inspecting an image. As illustrated in FIG. 1, the information processing system 100 includes a camera 120, an information processing apparatus 130, and an output apparatus 140. The camera 120 captures an object 110 to obtain an image. The information processing apparatus 130 obtains the image (in the following description, may be referred to as a "captured image") obtained by the camera 120. The information processing apparatus 130 uses the captured image to determine a state of the object 110 (determine presence or absence of an abnormal area), and transmits a determination result to the output apparatus 140. The output apparatus 140 outputs the determination result received from the information processing apparatus 130. A form of output is arbitrary, and the form may be audio output or image output.

In the example of FIG. 1, the information processing apparatus 130 is illustrated as being directly connected (wired connection) to the camera 120, but the present invention is not limited to this example. The information processing apparatus 130 and the camera 120 may be wirelessly connected to each other, for example. For example, the information processing apparatus 130 may be connected to the camera 120 via a network such as Ethernet (registered trademark), WiFi, LTE, 3G, or 4G. Further, for example, the camera 120 and the information processing apparatus 130 may be integrated into one apparatus. Similarly, the output apparatus 140 and the information processing apparatus 130 may be integrated into one apparatus.

Figure 2:
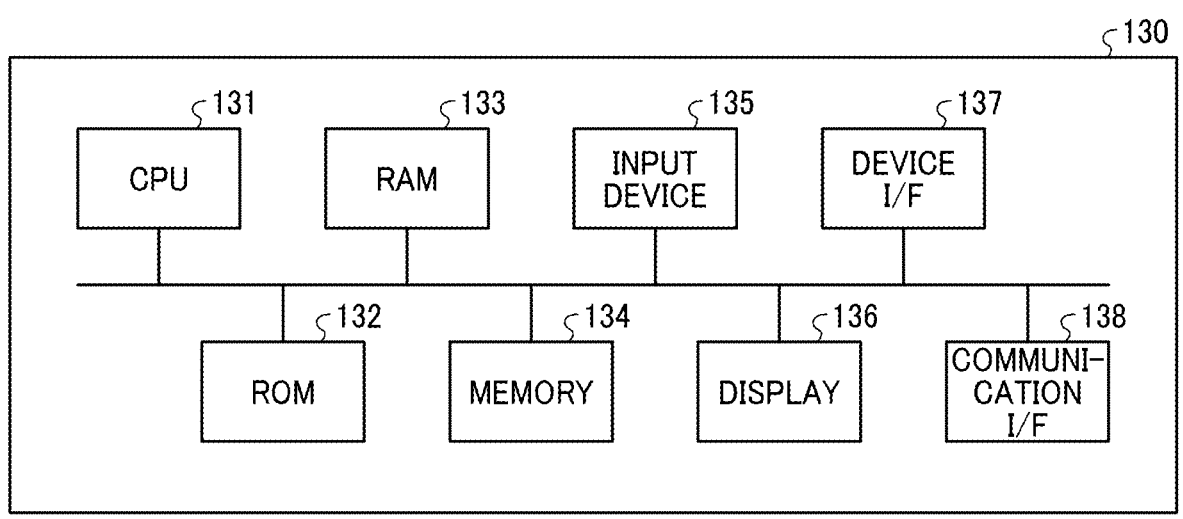
FIG. 2 is a diagram illustrating an example of a hardware configuration of an information processing apparatus.

FIG. 2 is a diagram illustrating an example of a hardware configuration of the information processing apparatus 130. The information processing apparatus 130 may be implemented as a personal computer, a workstation, or the like. As illustrated in FIG. 2, the information processing apparatus 130 includes a central processing unit (CPU) 131, a read-only memory (ROM) 132, a random access memory (RAM) 133, a memory 134, an input device 135, a display 136, a device interface (I/F) 137, and a communication I/F 138.

The CPU 131 controls entire operation of the information processing apparatus 130. The CPU 131 uses a predetermined area of the RAM 133 as a work area to execute a program stored in the ROM 132, the memory 134, or the like, and implements various functions of the information processing apparatus 130. Specific contents of the functions of the information processing apparatus 130 will be described later.

The ROM 132 is a non-volatile memory (non-rewritable memory) for storing the program, various setting information, and the like related to the information processing apparatus 130.

The RAM 133 is a storage device such as synchronous dynamic random access memory (SDRAM), and functions as the work area of the CPU 131 or a buffer memory, etc.

The memory 134 is an auxiliary storage device such as a hard disk drive (HDD). The input device 135 accepts operation by a user, and may be implemented by a keyboard, a mouse, touch panel, etc. The display 136 displays various types of information relating to the information processing apparatus 130, and includes a liquid crystal display, for example.

The device I/F 137 is an interface for connecting the information processing apparatus 130 to the camera 120 and the output apparatus 140, for example. The communication I/F 138 is an interface for connecting the information processing apparatus 130 with a network such as the Internet. For example, instead of the device I/F 137, the information processing apparatus 130 may be connected to the camera 120 and the output apparatus 140 via the communication I/F 138.

Figure 3:
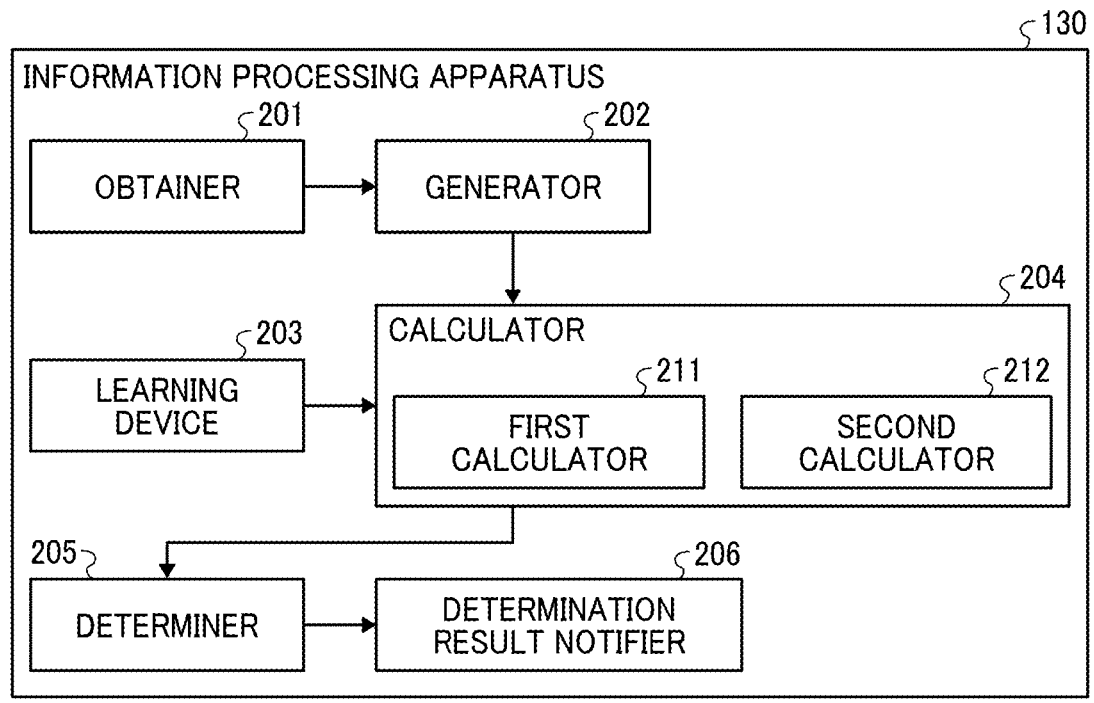
FIG. 3 is a diagram illustrating an example of functions of the information processing apparatus.

FIG. 3 is a diagram illustrating an example of functions of the information processing apparatus 130. As illustrated in FIG. 3, the information processing apparatus 130 includes an obtainer 201, a generator 202, a learning device 203, a calculator 204, a determiner 205, and a determination result notifier 206. For convenience of description, in the example of FIG. 3, the functions relating to the present embodiment are mainly illustrated, but the functions of the information processing apparatus 130 are not limited to this example.

The obtainer 201 obtains the captured image from the camera 120. The generator 202 applies a plurality of different spatial filters to one input image (the captured image obtained by the obtainer 201) to generate a plurality of filtered images. Here, the number of filters to be applied is 12, but it is not limited to 12. In a case where 12 filters are used as in the present embodiment, for example, 3 scales×4 directions (0 degree direction, 45 degree direction, 90 degree direction, 135 degree direction) can be set. For example, as filter coefficients, four filter matrices represented by equations 1 to 4 below can be used.

$$p\_fil(:,:,1) = \begin{matrix} -1 & 0 & 1 \\ -1 & 0 & 1 \\ -1 & 0 & 1 \end{matrix} \quad \text{[Mathematical Equation 1]}$$

$$p\_fil(:,:,2) = \begin{matrix} 0 & -1 & 0 \\ -1 & 0 & 1 \\ 0 & 1 & 0 \end{matrix} \quad \text{[Mathematical Equation 2]}$$

$$p\_fil(:,:,3) = \begin{matrix} -1 & -1 & -1 \\ 0 & 0 & 0 \\ 1 & 1 & 1 \end{matrix} \quad \text{[Mathematical Equation 3]}$$

$$p\_fil(:,:,4) = \begin{matrix} 0 & -1 & 0 \\ 1 & 0 & -1 \\ 0 & 1 & 0 \end{matrix} \quad \text{[Mathematical Equation 4]}$$

As for the scales, in addition to an equal magnification image, by applying images obtained by reducing the input image by ¼ times and ⅛ times to the above-described filters and restoring the images to equal magnification images, a total of 12 filtered images are obtained. Here, a captured image to which the above-described filters are not applied (exceptionally, the captured image may be regarded as one aspect of the filtered image) is added, and abnormality detection is performed using 13 filtered images in this example.

The learning device 203 learns the image of the non-defective object 110 based on a plurality of images having no defect (non-defective images) prepared in advance. More specifically, the learning device 203 learns a model group including one or more models each having a parameter representing a target shape for each of the plurality of spatial filters. In this example, the learning device 203 learns 13 model groups corresponding one-to-one with 13 filtered images. In this example, a mean (pixel mean value) $\mu(x, y)$ and a variance (pixel variance value) $\sigma^2(x, y)$ of pixel values of the respective plurality of non-defective images are adopted as parameters, but the parameters are not limited to the mean and the variance.

Hereinafter, the learning method will be described. Here, an example will be described of learning a model group including a plurality (K) of models, for any one spatial filter. As for the models, it is assumed that a plurality of pixels has a normal distribution, and it is a premise that there is the plurality (K) of such models. An image that can be observed is assumed to be an image generated from any of the plurality of models. Here, it is unknown which model the image is observed from, and the model is a hidden variable. When learning is completed (when estimation of the model is completed), the pixel mean value $\mu(x, y)$ and the pixel variance value $\sigma^2(x, y)$ are obtained for each of the plurality of models. During inspection, presence or absence of the defect in the captured image is determined based on the parameters for each of the plurality of models.

Since the hidden variable and the model parameters cannot be determined at the same time, here, the learning is performed by using an expectation-maximization (EM) algorithm, which is effective for estimating the model parameters in a case where there is the hidden variable. Hereinafter, an E step and an M step of the EM algorithm will be separately described.

The learning is started from the E step first. The learning device 203 calculates a Z-score for each of the K models, for each of the plurality of pixels included in the input image (n non-defective images (non-defective filtered images) corresponding to the one spatial filter). A Z-score $Z_{nk}(x, y)$ for the k-th model of a pixel (x, y) included in the n-th input image is represented by equation 5 below. In equation 5 below, $I_n(x, y)$ is a pixel value (luminance value) of the pixel (x, y) of the n-th input image. In addition, $\mu_k(x, y)$ and $\sigma^2_k(x, y)$ are parameters of the pixel (x, y) of the k-th model. More specifically, $\mu_k(x, y)$ is a pixel mean value of the pixel (x, y) of the k-th model, and $\sigma^2_k(x, y)$ is a pixel variance value of the pixel (x, y) of the k-th model. The Z-score is a value representing an outlier in a case where a normal distribution is assumed for a probability model.

$$Z_{nk}(x, y) = \frac{|I_n(x, y) - \mu_k(x, y)|}{\sqrt{\sigma^2_k(x, y)}}$$ [Mathematical Equation 5]

Next, the learning device 203 obtains a probability $e_{nk}$ that the n-th input image In corresponds to the k-th model k. The probability $e_{nk}$ can be represented by equation 6 below. In this example, the learning device 203 assigns the Z-score to an equation of a standard normal distribution with a mean of 0 and a variance of 1, to calculate a probability density for each pixel, and calculates a product of the probability density for each pixel or each area to obtain a joint probability. Note that, X and Y in equation 6 below are the number of pixels in the lateral direction and the vertical direction of the input image, respectively. Here, the probability $e_{nk}$ is obtained from a distribution of the pixel values over the entire image, not for each pixel. As a result, it is possible to appropriately obtain a probability of which model corresponds to the input image while viewing the entire parts of the input image.

$$e_{nk} = \prod_{x=1}^{X} \prod_{y=1}^{Y} e^{-\left(\frac{Z_{nk}(x,y)^2}{2}\right)}$$ [Mathematical Equation 6]

Next, the learning device 203 uses the above-described probability $e_{nk}$ to obtain a burden ratio $\gamma_{nk}$ corresponding to an expected value of occurrence of the input image from any model. The burden ratio $\gamma_{nk}$ can be obtained by equation 7 below. N represents the total number of input images, and K represents the number of models. The above is the content of the E step.

$$\gamma_{nk}(x, y) = \frac{\sum_{n=1}^{N} (e_{nk}) e_{nk}}{\sum_{k=1}^{K} \left[\sum_{n=1}^{N} (e_{nk}) e_{nk}\right]}$$ [Mathematical Equation 7]

After the E step is completed, the learning device 203 estimates the parameters of each model in the M step. More specifically, the learning device 203 performs weighting with the burden ratio $\gamma_{nk}$ to obtain the pixel mean value $\mu_k(x, y)$ of the pixels of the k-th model. In this example, the pixel mean value $\mu_k(x, y)$ can be obtained by equation 8 below.

$$\mu_k(x, y) = \frac{1}{N_k} \sum_{n=1}^{N} \gamma_{nk} I_n(x, y)$$ [Mathematical Equation 8]

The learning device 203 performs weighting with the burden ratio $\gamma_{nk}$ to obtain the pixel variance value $\sigma^2_k(x, y)$ of the pixels of the k-th model. In this example, the pixel variance value $\sigma^2_k(x, y)$ can be obtained by equation 9 below.

$$\sigma^2_k(x, y) = \frac{1}{N_k} \sum_{n=1}^{N} \gamma_{nk} \{\mu_k(x, y) - I_n(x, y)\}^2$$ [Mathematical Equation 9]

$N_k$ in equations 8 and 9 is obtained by equation 10 below.

$$N_k = \sum_{n=1}^{N} \gamma_{nk}$$ [Mathematical Equation 10]

After the above-described M step is completed, the learning device 203 returns to the E step again, and repeats the processing until a parameter variation from the previous time becomes equal to or less than a threshold value (until a convergence condition is satisfied). By repeating the above-described E step and M step, the parameters of the model can be estimated in a state where there is the hidden variable. Note that, as for an initial value, for example, $\mu_k(x, y)$ may be a random number and $\sigma^2_k(x, y)$ may be 1, or the pixel value of the input image may be set as $\mu_k(x, y)$ as the initial value of the model, in a case where it is clear which model the input image is desired to be classified into, so that the user can classify types while viewing the input image. As described above, the learning device 203 learns the parameters ($\mu_k(x, y)$, $\sigma^2_k(x, y)$) of the K models.

Figure 4:
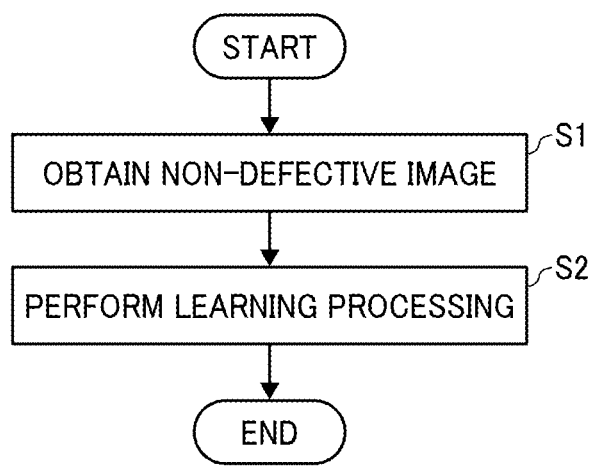
FIG. 4 is a flowchart illustrating an example operation performed by a learning device.

FIG. 4 is a flowchart illustrating an operation example of the learning device 203. As illustrated in FIG. 4, first, the learning device 203 obtains a non-defective image prepared in advance (step S1). For example, for each of the plurality of spatial filters, a non-defective image group prepared in advance may be stored in the memory 134 or the like, and the learning device 203 may access the memory 134 or the like, to obtain the non-defective image group for each of the plurality of spatial filters. Next, the learning device 203 performs learning processing described above (step S2).

Figure 5:
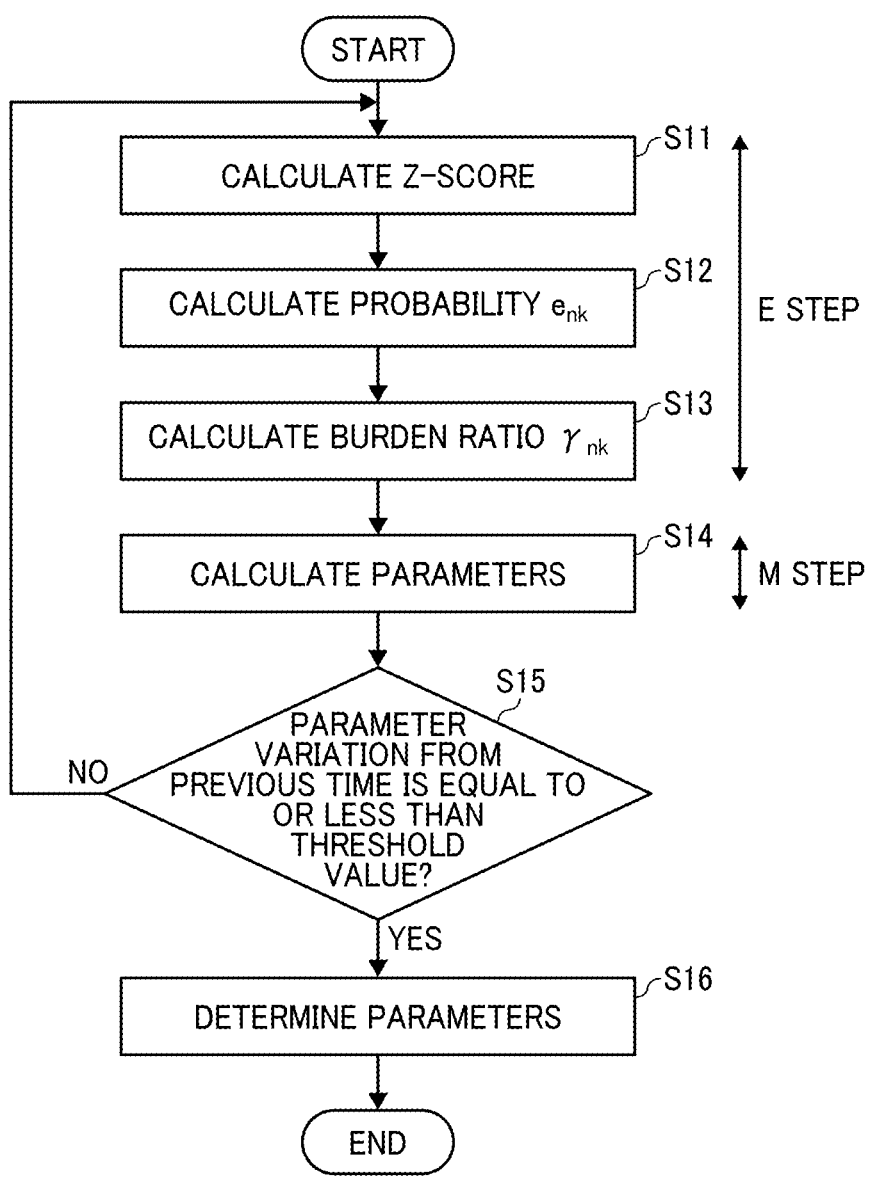
FIG. 5 is a flowchart illustrating an example operation of learning processing performed by the learning device.

FIG. 5 is a flowchart illustrating detailed contents of the learning processing in step S2. Since specific contents of each step are as described above, the description is omitted as appropriate. The processing of each step illustrated in FIG. 5 is executed for the number of spatial filters; however, for convenience of description, processing corresponding to one spatial filter will be described here. As illustrated in FIG. 5, the learning device 203 calculates the Z-score for each of the K models, for each of the plurality of pixels included in the input image (non-defective image) corresponding to a target spatial filter (step S11). Next, the learning device 203 obtains the probability $e_{nk}$ (step S12). Next, the learning device 203 obtains the burden ratio $\gamma_{nk}$ (step S13). Next, the learning device 203 calculates the parameters ($\mu_k(x, y)$, $\sigma^2_k(x, y)$) of each model (step S14). The processing in steps S11 to S13 described above corresponds to the E step, and the processing in step S14 described above corresponds to the M step.

Next, the learning device 203 determines whether or not the parameter variation from the previous time is equal to or less than the threshold value (step S15). In a case where a result in step S15 is negative (step S15: No), the processing in step S11 and subsequent steps described above is repeated. In a case where the result in step S15 is positive (step S15: Yes), the parameters calculated in step S14 are determined as the final parameters (step S16). The parameters determined as described above are stored in the memory 134 or the like, for example.

Figure 6:
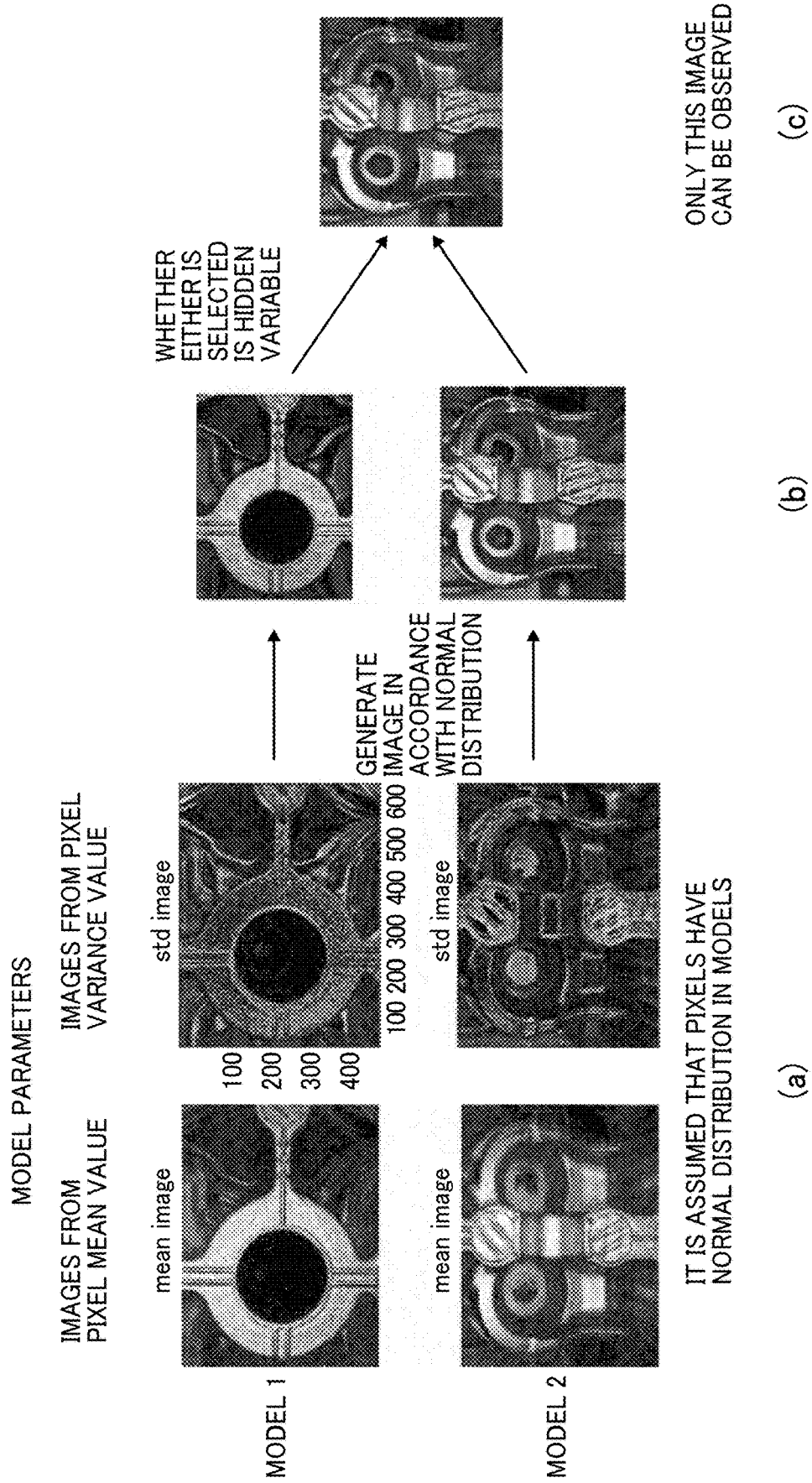
FIG. 6 is a diagram for explaining a model estimation problem as a premise of processing by the learning device.

FIGS. 6A to 6C are explanatory diagrams of a model estimation problem as a premise of the processing by the learning device 203 described above. The sample images used in FIGS. 6A to 6C are obtained by processing the assignment images cited from "Visual Inspection Algorithm Contest 2014, Technical Committee on Industrial Application of Image Processing" (the Visual Inspection Algorithm Contest 2014, organized by the Technical Committee on Industrial Application of Image Processing, the Japan Society of Precision Engineering). In the example of (a) to (c) of FIG. 6, an example will be described in a case where there are two types of models (two types of models included in the model group corresponding to any of the spatial filters), that is, K=2. In the example of (a) to (c) of FIG. 6, it is assumed that there are two models whose pixels are assumed to have a normal distribution, and the image that can be observed is an image generated from any of the models. Here, it is unknown which model the image is observed from, and the model is the hidden variable. When the learning is completed, that is, when the estimation of the model is completed, a pixel mean image and a pixel variance image for each model illustrated on the left in (a) to (c) of FIG. 6 are obtained. Based on the two images, it is detected whether or not there is a defect in the input image during a test.

As described above, in the learning processing of the present embodiment, the pixel mean value $\mu_k(x, y)$ and the pixel variance value $\sigma^2_k(x, y)$ that optimize the burden ratio $\gamma_{nk}$ are determined and stored. (a) of FIG. 6 visually displays model data in which the pixel mean value $\mu_k(x, y)$ and the pixel variance value $\sigma^2_k(x, y)$ determined in step S16 of FIG. 5 mapped and illustrated for each pixel (x, y). In the present embodiment, the information illustrated in (a) of FIG. 6 is used, and on the basis of the probability $e_{nk}$ and the burden ratio $\gamma_{nk}$, the model that is the hidden variable is estimated from a measured image, and is selected or weighted to be considered.

Referring back to FIG. 3, the description of the functions of the information processing apparatus 130 will be continued. Based on the plurality of filtered images generated by the generator 202 and the model group learned by the learning device 203, the calculator 204 calculates the Z-score in consideration of all the models. Here, the calculator 204 includes a first calculator 211 and a second calculator 212.

The first calculator 211 uses a plurality of model groups corresponding one-to-one with the plurality of filtered images, to calculate a score indicating a value corresponding to a difference from a corresponding one of the model groups (in this example, a higher value is indicated as the difference from the model group is larger), for each of the plurality of pixels included in each of the plurality of filtered images. The first calculator 211 calculates the score, for each of the plurality of pixels included in each of the plurality of filtered images, based on the pixel values of the respective pixels and the parameters of the corresponding one of the model groups. Here, the score is represented by the Z-score.

Hereinafter, a method will be described that uses a model group corresponding to any one filtered image to calculate the Z-score of each pixel included in the filtered image; however, the Z-score is calculated by the same method for each pixel of other filtered images. Here, an example will be described in a case where K models are included in the model group corresponding to the any one filtered image; however, not limited to the example, only one model may be included in the model group (the number of models included in the model group is arbitrary), for example.

When the one filtered image (input image) is generated by the generator 202 and input to the first calculator 211, the first calculator 211 uses equation 5 above to calculate the Z-score $Z_{nk}(x, y)$ for each model, for each pixel included in the one filtered image. In addition, the first calculator 211 uses equation 6 above to obtain the probability $e_{nk}$. Then, the first calculator 211 uses equation 11 below to obtain an outlier from the model, that is, a defect estimation amount $S_n(x, y)$, for each pixel included in the one filtered image. In a multi-model in which a model group includes a plurality of models, the defect estimation amount $S_n(x, y)$ is the Z-score based on the occurrence probability of the learned model. In this example, the first calculator 211 calculates the defect estimation amount $S_n(x, y)$ of each pixel of the one filtered image as the final Z-score. That is, in the present embodiment, in a case where a model group corresponding to any filtered image includes a plurality of models, for each of the plurality of pixels included in the filtered image, the first calculator 211 determines the final Z-score of each of the pixels on the basis of a unit score indicating a value corresponding to a difference from each model of each of the pixels (in this example, the Z-score $Z_{nk}(x, y)$ for each of the K models), and the probability $e_{nk}$ that the filtered image corresponds to each model.

$$S_n(x, y) = \sum_{k=1}^{K} \frac{e_{nk}}{\sum_{k=1}^{K}(e_{nk})} |Z_{nk}(x, y)| \qquad \text{[Mathematical Equation 11]}$$

Here, in a portion where the luminance values of the image (learned image) obtained by the learning are substantially uniform, if the luminance value of a corresponding portion of the input image for inspection is slightly different from the luminance value of the learned image, the Z-score becomes large as a major abnormality. However, since a minute difference between pixels in that portion cannot be known by human senses, the minute difference is not regarded as abnormal in general visual inspection. Thus, for the purpose of matching to such human visual characteristics, by changing equation 5 above to equation 12 below, accuracy of the inspection can be improved.

$$Z_{nk(x,y)} = \frac{|In(x, y) - M_k(x, y)|}{\sqrt{sat(\sigma_k^2(x, y))}} \qquad \text{[Mathematical Equation 12]}$$

Here, sat(x) in equation 12 above is a function represented by equation 13 below.

sat(x)=x if x>c c if x<=c  [Mathematical Equation 13]

In equation 13 above, c is a constant and is a parameter to be adjusted while a result of the test is examined. By applying the function represented by equation 13 above to the variance value, even in a case where the luminance values of the respective pixels included in an area of the learned image are all or almost uniform, the learned variance value is 0 or a constant value (a value of c above) that is not a small value. For that reason, even in a case where the mean value of the luminance values of the respective pixels in the portion where the luminance values in the learned image are substantially uniform, and the luminance value of the corresponding portion of the input image are slightly different from each other during inspection, the Z-score can be inhibited from becoming too large.

Note that, even if other than the function represented by equation 13 above is used, it is sufficient that the learned variance value does not become too small, so that equation 5 above may be changed to equation 14 below, for example.

$$Z_{nk(x,y)} = \frac{|In(x, y) - M_k(x, y)|}{\sqrt{\sigma_k^2(x, y) + d}}$$ [Mathematical Equation 14]

Here, d in equation 14 above is a constant and is a parameter to be adjusted while a result of the test is examined. By using this equation, the denominator does not become excessively small, so that the Z-score does not become too large.

As described above, in the portion where the luminance values of the learned image are substantially uniform, when the luminance value of the corresponding portion of the input image during inspection is shifted even a little, the shift is detected as a large abnormality; however, the minute difference between the pixels cannot be known by the human senses. Thus, by reducing sensitivity of abnormality detection in that portion, the above disadvantage can be solved. That is, the information processing apparatus 130 of the present embodiment may have a function (variance corrector) of correcting the pixel variance value indicating the variance of the pixel values of the non-defective image to a value larger than a threshold value (a very small value such as 0). For example, the above-described first calculator 211 may also serve as the variance corrector, or the variance corrector may be provided separately from the above-described first calculator 211.

As described above, the first calculator 211 calculates the Z-score for each of the plurality of pixels included in each of the plurality of filtered images. In the following description, the Z-score of the pixel (x, y) of the m-th filtered image may be represented as $Z_m(x, y)$.

Here, since a normal distribution is assumed as the occurrence probability of each pixel, the Z-score indicates an occurrence probability of the corresponding pixel of the input image represented by a multiple of σ in the standard normal distribution, when the learned model is considered. In this example, an example has been described in which a multi-model is used; however, the same thing may be performed assuming a single model, of course. In that case, K=1 is set, the model is obtained by equations 8 and 9 above during learning, and the Z-score is calculated by equation 5 during detection. Here, it is assumed that the pixels have a normal distribution; however, to further improve the accuracy, modeling may be performed as a mixed Gaussian distribution using the EM algorithm, in the same way as performed in the multi-model.

The second calculator 212 calculates an integrated score $Z_{total}(x, y)$ indicating a result of integrating the Z-scores $Z_m(x, y)$ of the respective plurality of pixels corresponding to each other over the plurality of filtered images. That is, it may be regarded that the integrated score $Z_{total}(x, y)$ is calculated of the pixels of one image in which the plurality of filtered images is integrated. It is assumed that 13 filtered images have the same number of pixels, and the pixels correspond to each other, in this example. Here, since the Z-score $Z_m(x, y)$ is a standard deviation in the standard normal distribution, the second calculator 212 calculates the integrated score $Z_{total}(x, y)$, for each of the plurality of pixels corresponding to each other over the plurality of filtered images, on the basis of a joint probability of occurrence probabilities $P_m(x, y)$ corresponding to the Z-scores $Z_m(x, y)$ of the respective plurality of pixels. More specifically, the second calculator 212 calculates the occurrence probability $P_m(x, y)$ corresponding to the Z-score $Z_m(x, y)$ by equation 15 below, and calculates the integrated score $Z_{total}(x, y)$ by equation 16 below.

$$P_m(x, y) = \frac{1}{\sqrt{2\pi}} \exp\left(-\frac{Z_m(x, y)^2}{2}\right)$$ [Mathematical Equation 15]

$$Z_{total}(x, y) = -2\log\left[\sqrt{2\pi}\left\{\prod_{m=1}^{M} P_m(x, y)\right\}^{1/M}\right]$$ [Mathematical Equation 16]

The integrated score $Z_{total}(x, y)$ is a value of the Z-score in consideration of all the model groups. This value uniformly indicates all the spatial filters, that is, elements such as various scales and various edge directions, as an occurrence probability with a basis of the standard deviation in the standard normal distribution, and coincides with a value indicating an acceptable range represented by a multiple of σ, which is often used in a so-called production process and the like. For that reason, by determining the threshold value with this value, it is not necessary to set an individual threshold value for each of the plurality of spatial filters, and further, it is possible to determine an abnormality with a criterion with a basis such as the value indicating the acceptable range represented by the multiple of σ.

Figure 7:
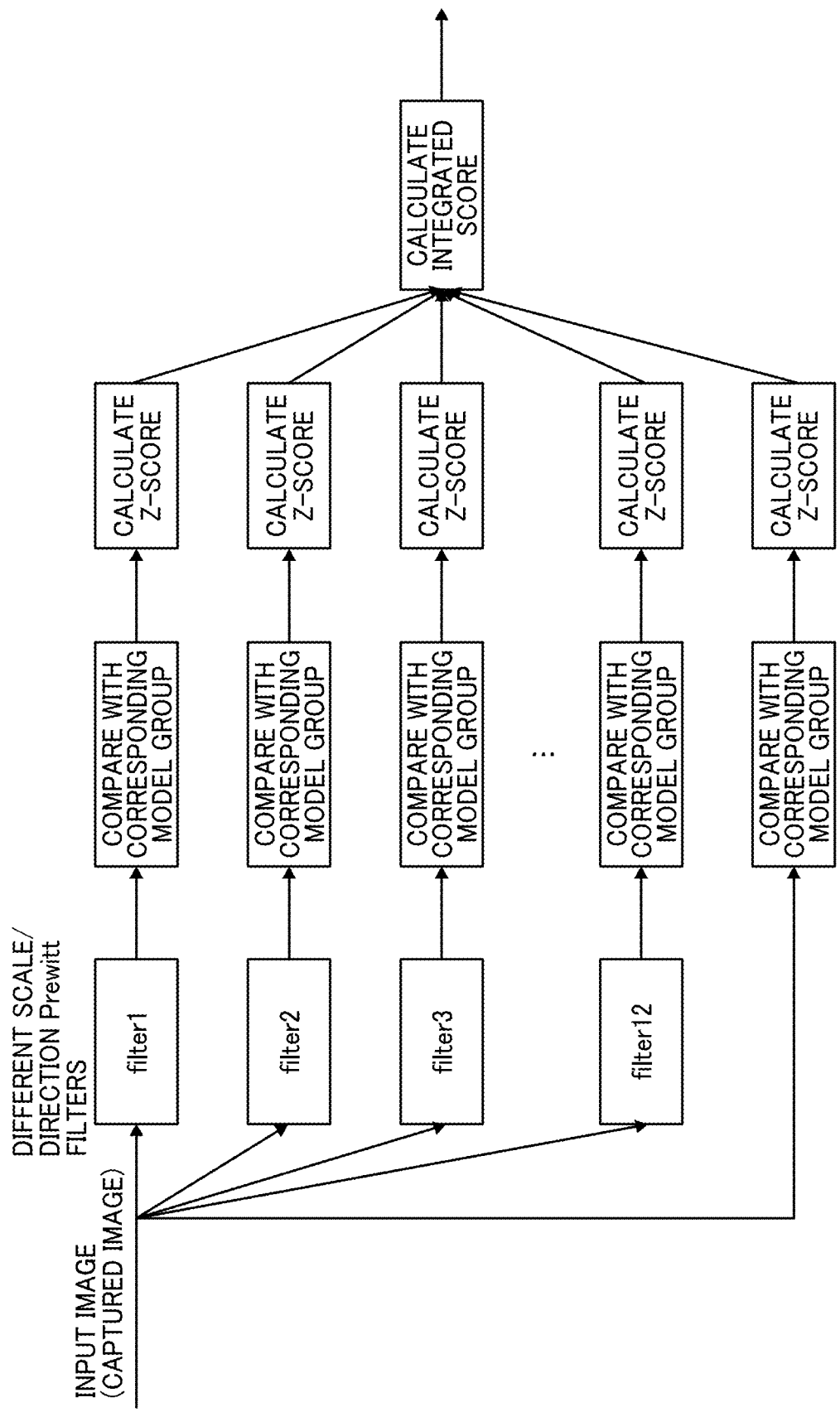
FIG. 7 is a schematic diagram illustrating a general arrangement of an algorithm to calculate an integrated score, according to an embodiment.

As described above, in the present embodiment, during inspection, the plurality of different spatial filters is applied to one input image (captured image) and the plurality of filtered images is generated, and the Z-score $Z_m(x, y)$ is calculated corresponding to the difference from the corresponding one of the model groups, for each of the plurality of pixels included in each of the plurality of filtered images. Then, the integrated score $Z_{total}(x, y)$ is calculated in which Z-scores $Z_m(x, y)$ is integrated of the respective plurality of pixels corresponding to each other over the plurality of filtered images. FIG. 7 is a schematic diagram illustrating a general arrangement of an algorithm to calculate the integrated score $Z_{total}(x, y)$.

Referring back to FIG. 3, the description will be continued. The determiner 205 determines an abnormality based on the integrated score $Z_{total}(x, y)$. More specifically, the determiner 205 can determine an area indicating the integrated score $Z_{total}(x, y)$ equal to or greater than a predetermined threshold value, out of the captured images obtained by the obtainer 201, as an abnormal area (a defect area in which a defect exists).

The determination result notifier 206 notifies the output apparatus 140 of information indicating the abnormal area determined by the determiner 205. The output apparatus 140 receiving the notification outputs information for notification of the abnormal area (the information may be audio information or image information).

Figure 8:
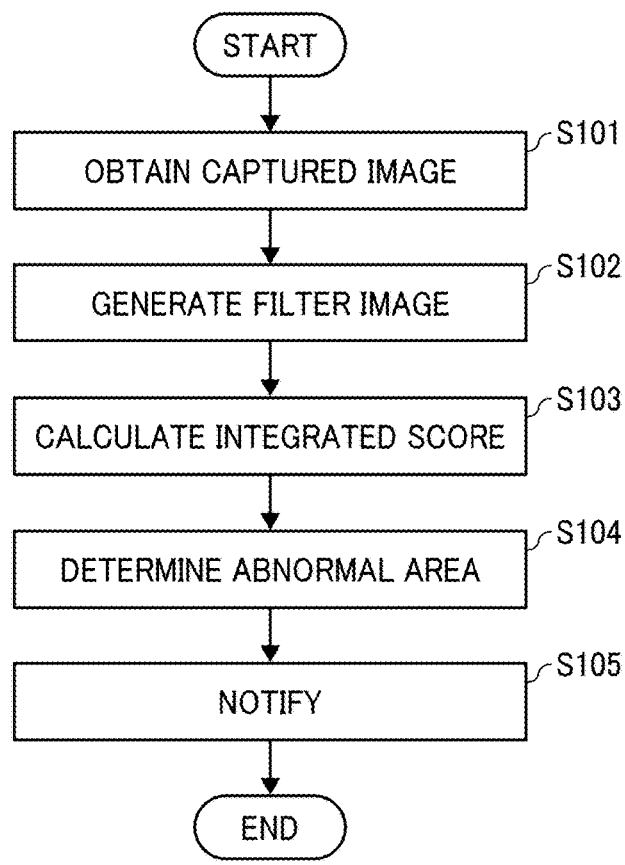
FIG. 8 is a flowchart illustrating an example operation of inspecting an image, performed by the information processing apparatus.

FIG. 8 is a flowchart illustrating an operation example of the information processing apparatus 130 during inspection. As illustrated in FIG. 8, the obtainer 201 obtains the captured image from the camera 120 (step S101). Next, the generator 202 applies the plurality of different spatial filters to the captured image (input image) obtained in step S101, to generate the plurality of filtered images (step S102). Next, on the basis of the plurality of filtered images obtained in step S102 and the plurality of model groups (corresponding one-to-one with the plurality of filtered images) learned in advance by the learning device 203, the calculator 204 calculates the above-described integrated score $Z_{total}(x, y)$ (step S103). Next, the determiner 205 determines the area indicating the integrated score $Z_{total}(x, y)$ equal to or greater than the predetermined threshold value, out of the captured images obtained in step S101, as the abnormal area (the defect area in which the defect exists) (step S104). Next, the determination result notifier 206 notifies the output apparatus 140 of a determination result in step S104 (step S105).

As described above, in the present embodiment, the abnormal area of the input image (captured image) is determined on the basis of the integrated score $Z_{total}(x, y)$ in which the Z-scores $Z_m(x, y)$ is integrated of the respective plurality of pixels corresponding to each other over the plurality of filtered images, so that abnormality determination can be performed on a certain criterion uniformly for various objects.

In the above, the embodiments according to the present invention have been described; however, the present invention is not limited to the above-described embodiments, and in the implementation stage, the constituent elements can be modified and embodied without departing from the gist of the invention. In addition, various inventions can be formed by appropriately combining the constituent elements disclosed in the above-described embodiments. For example, some constituent elements may be removed from all the constituent elements described in the embodiment. Further, different embodiments and modifications may be appropriately combined.

The program executed by the information processing system 100 according to the embodiment described above may be stored in a computer-readable recording medium such as a CD-ROM, a flexible disk (FD), a CD-R, a digital versatile disk (DVD), a universal serial bus (USB) memory device, or may be provided or distributed via a network such as the Internet. In addition, various programs may be provided by being incorporated in ROM or the like in advance.

Hereinafter, modifications will be described.

Modification 1

For example, the second calculator 212 may calculate a mean value of the Z-scores $Z_m(x, y)$ of the respective plurality of pixels, as the integrated score $Z_{total}(x, y)$, for each of the plurality of pixels corresponding to each other over the plurality of filtered images. In this case, the second calculator 212 can calculate the integrated score $Z_{total}(x, y)$ by equation 17 below.

$$Z_{total}(x, y) = \frac{1}{M}\sum_{m=1}^{M} Z_m(x, y) \qquad \text{[Mathematical Equation 17]}$$

Modification 2

For example, the second calculator 212 may calculate a total value of the Z-scores $Z_m(x, y)$ of the respective plurality of pixels, as the integrated score $Z_{total}(x, y)$, for each of the plurality of pixels corresponding to each other over the plurality of filtered images. In this case, the second calculator 212 can calculate the integrated score $Z_{total}(x, y)$ by equation 18 below.

$$Z_{total}(x, y) = \sum_{m=1}^{M} Z_m(x, y) \qquad \text{[Mathematical Equation 18]}$$

Modification 3

Figure 9:
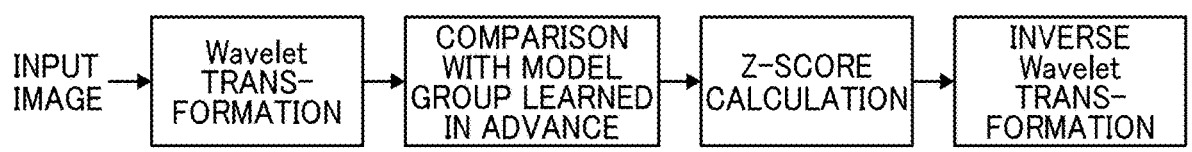
FIG. 9 is a schematic diagram for explaining a processing flow of a modified example.

For example, wavelet transformation may be used that computes a filter group at a time. FIG. 9 is a schematic diagram illustrating a processing flow in this case. First, by performing wavelet transformation, the input image is converted into one image including a multi-level image (that may be regarded as a plurality of levels corresponding one-to-one with the above-described plurality of spatial filters). Next, the image is compared with one model obtained by learning in advance, and the Z-score $Z_m(x, y)$ of each pixel is calculated similarly to the above-described embodiment. The one model in this case can be regarded as one model in which models for the respective plurality of filtered images (models for the respective levels) are integrated. From another view point, it can be considered that the one model in this case includes a plurality of models corresponding one-to-one with the plurality of filtered images. After that, by restoring the image to the original single image by inverse wavelet transformation, the integrated score $Z_{total}(x, y)$ is obtained in which the Z-scores $Z_m(x, y)$ for the respective pixels are integrated. As a result, the integrated score $Z_{total}(x, y)$ can be obtained of the pixels included in the input image, similarly to the above-described embodiment. According to this embodiment, there is an advantage that computation time can be reduced by using wavelet transformation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
processing circuitry configured to:
apply a plurality of different spatial filters to one input image to generate a plurality of filtered images;
calculate, for each of a plurality of pixels included in each of the plurality of filtered image, a score indicating a value determined by a difference from a corresponding one of a plurality of model groups, the plurality of model groups respectively corresponding to the plurality of filtered images such that each of the plurality of model groups include one or more models having a parameter learned using machine learning, the parameter representing a target shape;
calculate an integrated score by integrating the scores of the plurality of pixels corresponding to each other over the plurality of filtered images; and
determine an abnormality based on the integrated score by determining an area of the one input image having the integrated score greater than or equal to a threshold value as an abnormal area without utilizing individual threshold values for each of the plurality of different spatial filters.

2. The information processing apparatus according to claim 1, wherein
the parameter includes a pixel mean value indicating a mean of pixel values of a non-defective image and a pixel variance value indicating a variance of the pixel values of the non-defective image, and
the processing circuitry is configured to calculate the score, for each of the plurality of pixels included in each of the plurality of filtered images, based on the pixel values of the respective pixels and the parameter corresponding thereto.

3. The information processing apparatus according to claim 2, wherein
the processing circuitry is configured to correct the pixel variance value to have a value larger than the threshold value.

4. The information processing apparatus according to claim 2, wherein
the score is a Z-score.

5. The information processing apparatus according to claim 4, wherein
the processing circuitry is configured to calculate the integrated score based on a joint probability of occurrence probabilities corresponding to the scores of the plurality of pixels, for each of the plurality of pixels corresponding to each other over the plurality of filtered images.

6. The information processing apparatus according to claim 5, wherein
the processing circuitry is configured to calculate the occurrence probability corresponding to the score by equation (1), and calculates the integrated score by equation (2):

$$P_m(x, y) = \frac{1}{\sqrt{2\pi}} \exp\left(-\frac{Z_m(x, y)^2}{2}\right) \quad \text{(Equation 1)}$$

where $P_m(x, y)$ represents an occurrence probability, and $Z_m(x, y)$ represents the Z-score, and $$Z_{total}(x, y) = -2\log\left[\sqrt{2\pi}\left\{\sum_{m=1}^{M} P_m(x, y)\right\}^{1/M}\right] \quad \text{(Equation 2)}$$

where $Z_{total}(x, y)$ represents the integrated score, and M represents a number of filtered images.

7. The information processing apparatus according to claim 1, wherein
the processing circuitry is configured to calculate a mean value of the scores of the plurality of pixels, as the integrated score, for each of the plurality of pixels corresponding to each other over the plurality of filtered images.

8. The information processing apparatus according to claim 1, wherein
the processing circuitry is configured to calculate a total value of the scores of the plurality of pixels, as the integrated score, for each of the plurality of pixels corresponding to each other over the plurality of filtered images.

9. The information processing apparatus according to claim 1, wherein,
when one of the model groups corresponding to any of the filtered images includes a plurality of models, for each of the plurality of pixels included in the filtered image, the processing circuitry is configured to determine the score of each of the pixels based on a unit score indicating a value corresponding to a difference from each model of each of the pixels, and a probability that the filtered image corresponds to each model.

10. An information processing method, comprising:
applying a plurality of different spatial filters to one input image to generate a plurality of filtered images;
calculating, for each of a plurality of pixels included in each of the plurality of filtered image, a score indicating a value determined by a difference from a corresponding one of a plurality of model groups, the plurality of model groups respectively corresponding to the plurality of filtered images such that each of the plurality of model groups include one or more models having a parameter learned using machine learning, the parameter representing a target shape;
calculating an integrated score by integrating the scores of the plurality of pixels corresponding to each other over the plurality of filtered images; and
determining an abnormality based on the integrated score by determining an area of the one input image having the integrated score greater than or equal to a threshold value as an abnormal area without utilizing individual threshold values for each of the plurality of different spatial filters.

11. A non-transitory recording medium which, when executed by one or more processors, cause the processors to perform an information processing method comprising:
applying a plurality of different spatial filters to one input image to generate a plurality of filtered images;
calculating, for each of a plurality of pixels included in each of the plurality of filtered image, a score indicating a value determined by a difference from a corresponding one of a plurality of model groups, the plurality of model groups respectively corresponding to the plurality of filtered images such that each of the plurality of model groups include one or more models having a parameter learned using machine learning, the parameter representing a target shape;
calculating an integrated score by integrating the scores of the plurality of pixels corresponding to each other over the plurality of filtered images; and
determining an abnormality based on the integrated score by determining an area of the one input image having the integrated score greater than or equal to a threshold value as an abnormal area without utilizing individual threshold values for each of the plurality of different spatial filters.

12. The information processing apparatus according to claim 1, wherein the plurality of different spatial filters have each of one or more of different directions and scales.

13. The information processing apparatus according to claim 1, wherein, for each of the plurality of models, the parameter estimated using an expectation-maximization (EM) algorithm that generates a function and computes the parameter that maximizes the function.

14. The information processing apparatus according to claim 13, wherein the EM algorithm iteratively generates the function until a convergence condition is satisfied, and sets the parameter as the parameter that maximizes the function when the convergence condition is satisfied.

15. The information processing apparatus of claim 1, wherein the score is a z-score and the integrated score is a value of the z-score in consideration of all of the plurality of model groups.

16. The information processing apparatus of claim 15, wherein the abnormality is based on the integrated score such that the abnormality is determined uniformly for various objects.

* * * * *